United States Patent [19]

Kunz

[11] Patent Number: 5,423,965
[45] Date of Patent: Jun. 13, 1995

[54] PROCESS AND DEVICE FOR DEMINERALIZING AQUEOUS SOLUTIONS USING ION EXCHANGERS

[76] Inventor: Gerhard Kunz, Ruhrstrasse 111, D-5628 Heiligenhaus, Germany

[21] Appl. No.: 149,837
[22] Filed: Nov. 10, 1993
[51] Int. Cl.$^6$ ............................................. B01D 61/44
[52] U.S. Cl. .............................. 204/182.4; 204/182.5; 204/131; 204/263; 204/266; 204/275; 204/278; 204/301; 210/670; 521/26
[58] Field of Search ............... 521/26; 204/131, 182.4, 204/182.5, 263, 266, 275, 278; 210/301, 670

[56] References Cited

U.S. PATENT DOCUMENTS

| | | | |
|---|---|---|---|
| 2,788,319 | 4/1957 | Pearson | 204/182.4 |
| 2,980,598 | 4/1961 | Stoddard | 204/182.4 |
| 3,254,016 | 5/1966 | Stoddard | 204/182.4 |
| 4,636,296 | 1/1987 | Kunz | 204/182.5 |
| 4,687,561 | 8/1987 | Kunz | 204/182.5 |

Primary Examiner—John Niebling
Assistant Examiner—Arun S. Phasqe
Attorney, Agent, or Firm—Jacobson, Price, Holman & Stern

[57] ABSTRACT

An electrolytic process and apparatus are disclosed for regenerating separate bed ion exchange resins used to demineralize aqueous solutions, preferably softened water, without the use of additional chemicals. The cation exchanger is regenerated by applying a DC electric voltage between an anode and a cathode across the cation exchanger whereby hydrogen ions produced at the anode displace cations previously absorbed on the cation exchanger during the previous demineralization cycle. The displaced cations move towards the cathode under the influence of the electric voltage and there form a caustic solution with hydroxyl ions produced by the cathode. The cathodically generated caustic solution is then used to chemically regenerate the anion exchanger in a traditional manner. Two embodiments of the invention are disclosed, one of which is an intermittent system of demineralization and regeneration and the other is a continuously operating system.

37 Claims, 2 Drawing Sheets

PROCESS AND DEVICE FOR DEMINERALIZING AQUEOUS SOLUTIONS USING ION EXCHANGERS

FIELD OF INVENTION

This invention relates to a process and apparatus for demineralizing (or desalinating) aqueous solutions by cation and anion exchangers arranged in separate filter containers and subsequent regeneration of these exchangers using electrolysis.

BACKGROUND OF THE INVENTION

It has long been known to treat, e.g., demineralize, aqueous solutions, such as water, using ion exchangers and to regenerate these ion exchangers after demineralization or other treatment of the solution so as to replenish the ion exchangers for further treatment of the aqueous solution. Traditional ion exchangers are known cation and anion exchange resins, which are generally particulate materials in the form of granules, beads or grains, but can also be fibers, sheets and other forms. The ion exchangers are placed in filter containers through which the aqueous solution to be treated is consecutively piped so as to thoroughly contact the respective ion exchanger resins.

While the prior art regeneration of ion exchangers has been accomplished largely by supplying special acids and/or caustic solutions to the ion exchange materials, electrolytic processes have recently become known in which the ion exchangers are subjected to electrical voltage fields to produce an exchange of metal ions and the like by using the respective regeneration ions generated at the electrodes.

In such a previously known process according to DE-OS 38 05 813, regeneration of the ion exchangers is proposed by subjecting the ion exchangers to electrical voltage fields which exert a pulsating action on the ion exchangers and additionally have AC voltages superimposed on them to accelerate the regeneration of the ion exchangers.

Another process for treating aqueous solutions with regenerative treatment of the ion exchangers is shown in my earlier U.S. Pat. No. 4,636,296, in which electrode chambers are provided in a common vessel with various treatment chambers for loosening and regenerating the ion exchangers. The individual chambers, which are permeable to the migrating ions, are separated from each other by ion exchange membranes.

In these processes, some problems, mostly concerning the regeneration of the anion exchangers, may occur both in the functional aspects and in the equipment design. Thus, despite the high investment in chemical engineering and apparatus, it is not always possible to achieve sufficiently large regenerating capacities such as are known from traditional regeneration using supplied regenerating chemicals. Particularly, anionic salt components which require high concentrations of hydroxides for their desorption cannot always be removed during regeneration by electrical voltage fields. The reason for this poor performance is the high electrical resistance frequently exhibited by anion exchangers. This high resistance requires high electrical voltages to overcome the resistance which, in turn, results in an ionic current of a lower and hence insufficient concentration.

As a result, expensive equipment designs have been required in prior electrolytic regeneration systems. And, even with these expensive systems, the described problems still may produce an unsatisfactory regenerating action. This naturally results in a poor demineralization system and poor demineralization quality.

SUMMARY OF THE INVENTION

It is therefore the primary object of the present invention to provide a process and apparatus for treating aqueous solutions, especially demineralization, using known cation and anion exchange materials with subsequent regeneration of the ion exchangers to achieve high regenerating capacities and high demineralization qualities without the use of additional chemicals. As used herein, the terms "ion exchanger", whether anion, cation or both, and "ion exchange materials" are synonymous. The ion exchange materials may take any shape or form, although particulate ion exchangers are preferred.

It is a further object of the present invention to provide an electrolytic process and apparatus for regenerating an ion exchange system which has low energy consumption, and particularly to provide a practicable and reliable design which is simple and insensitive to contaminants, and which requires no expensive control system.

Based on chemical engineering process and design features for treating aqueous solutions using regeneratable cation and anion exchangers, it has now been discovered that, without feeding regenerating chemicals from the outside and without using selective anion exchange membranes, the highest regenerating capacity and, simultaneously, the lowest energy consumption are unexpectedly achieved if only the cation exchanger is subjected to the regenerative action of an electrical DC field. The caustic solution produced cathodically in this electrolytic process is concentrated and collected in the chamber containing the cation exchanger in the region of the cathode. The concentrated caustic solution is then used as a regenerating agent for the anion exchanger, in a traditional chemical regeneration, but without the need for additional chemicals.

Therefore, in accordance with the present invention, two electrodes, i.e. an anode and a cathode, are positioned at opposite sides of a cation exchanger of an ion exchange apparatus for demineralizing aqueous solutions, and a DC electrical field is impressed across the cation exchanger. Hydrogen ions are produced at the anode and are introduced into the cation exchanger. Under the influence of the DC field, these hydrogen ions move toward the cathode where they displace the cations (metal ions, such as sodium ions, etc.) which are present in the cation exchanger from the earlier demineralization cycle. These displaced cations then combine with hydroxyl ions formed at the cathode as a caustic solution in the region adjacent the cathode. This caustic solution formed cathodically during electrolytic regeneration of the cation exchanger is then fed into the anion exchanger to regenerate the latter.

Also in accordance with the present invention, the flushing of both ion exchangers following regeneration is preferably conducted in a direction opposite to the direction of displacement of the ions during their regeneration in the ion exchangers. Similarly, the aqueous solution, for example, a water solution containing salts to be desalinated, flows first through the cation exchanger and subsequently through the anion exchanger, and through both exchangers preferably in a direction opposite to the direction of displacement of the ions during regeneration of the exchangers.

Two embodiments of the present invention are disclosed to illustrate the invention. One exemplary embodiment in accordance with the present invention consists of a container with at least two filter chambers contained therein for the ion exchangers. Each chamber is equipped with feed and discharge lines for the liquids to be fed through the exchangers. The first filter chamber is filled with cation exchanger, and other filter chamber is filled with anion exchanger. The first filter chamber filled with cation exchanger is equipped with electrodes, one of which is connected as the anode and the other as the cathode. The anode is arranged near the upper end of the first filter chamber and the cathode is arranged near the bottom. The cathode is surrounded by a filter medium which restrains the cation exchanger away from the cathode but admits the aqueous electrolyte, thus forming a cathode space around the cathode. A feed line for untreated water to be demineralized and discharge lines for the electrolytic gases produced during regeneration of the cation exchanger are provided.

The cathode space is also connected via a liquid line to one end of the filter chamber containing anion exchanger in order to feed the caustic solution formed at the cathode to the anion exchange material at a controlled rate. This second filter chamber has a filter mechanism for feeding the caustic solution therein and an outlet for discharging desalinated aqueous solution from this chamber. Both filter chambers are connected at their ends via a line through which cationically treated aqueous solutions are fed into the second filter chamber filled with anion exchanger, and the desalinated solution leaves this second filter chamber as product liquid in the region of that chamber's other end.

These chemical engineering and design measures of regenerative cation displacement in the electrical field toward the cathode as well as the storage and concentration of the caustic solution formed there in space adjacent the cathode within the cation exchanger, as well as the feeding of the same into the filter chamber for the anion exchanger and its use therein as a regenerate for the anion exchanger, and subsequent desalination following regeneration, first by means of the cation exchanger and then by means of the anion exchanger, preferably in directions opposite to the aforesaid ion migrations during regenerative treatment, not only solve the problems previously plaguing the prior art but also produce several advantages in terms of energy, process engineering, equipment design and economy. These advantages can be summarized as follows.

First, through the use of electrical regeneration solely for the cation exchanger with enrichment of the generated caustic solution, and through the use of this caustic solution as a regenerant for the anion exchanger, the previously necessary apparatus cost for electrical regeneration of the anion exchanger and the necessary control units is obviated. In addition, the electrical energy consumption for this step of the process, which is very high because of the high electrical resistance of the anion exchanger in particular, is eliminated.

The desorption of the anionic salt components from the anion exchanger during regeneration, particularly for those that do not dissociate easily, is considerably easier and more complete since high concentrations are achieved by the caustic solution. Thus, even colloidal precipitates, such as silicates, can be removed. This results in a considerably better product quality for the desalinated water, particularly where the aqueous starting solution being treated has a high level of these contaminant materials.

Second, the use of the cathodically produced caustic solution, for example, a sodium solution, as regenerant for the anion exchanger has the additional advantage in that this caustic solution is heated up as it is formed adjacent to the cathode. This heat enhances the desorption of the aforementioned anion salt components from the anion exchanger, but without overheating, and hence without destroying the active groups as might occur with electrical regeneration.

Third, the concentrating of the caustic solution in the region of the cathode and the collection of said solution in a storage zone of the cation exchanger reduces the electrical resistance between electrodes. This permits a lower voltage for the anticipated current intensity or ionic current and hence a substantially lower energy consumption and a much lower heat development. Cooling means can therefore be made in simpler designs, or can be eliminated altogether. The economic advantage thus resides both in lower energy costs and in less expense for the apparatus.

Fourth, the inventive collection of the cathodically produced caustic solution near the cathode and in a storage zone of the cation exchanger makes the current intensity largely dependent on the concentration of the caustic solution when a constant voltage between the electrodes is used. This affords the advantage that a current intensity control can be accomplished in an extremely simple manner. The caustic solution concentration can be changed simply by controlling appropriate caustic solution discharge, thus resulting in a more cost-effective design for the electrical power supply, i.e., reduced investment costs.

Fifth, during regeneration, the cations and anions from the treated solution, or the demineralized water, and those absorbed by the ion exchangers are displaced from the higher exchanger layers to the lower ones, that is, the cationic layers by the hydrogen ions ($H^+$) produced at the anode and the anionic layers by the hydroxyl ions ($OH^-$) introduced in the form of a caustic solution. The upper layers in each case are subjected longest and most intensively to the action of these regenerative ions, so the lowest residual concentration of the desorbed ion species in the exchanger are found in these zones. Conducting the desalination process following regeneration in a direction opposite the respective displacement processes has the advantage that strong demineralization effects, i.e., lower residual salt concentrations in the product, are achieved. This is in turn due to the fact that the residual salt concentrations in a desalination process are determined by the ion exchange equilibria of the ion exchanger layers through which the solution last flows.

Another advantageous refinement of the present invention is that at least one predetermined current intensity can be established as the limit value for the automatic completion and/or the restarting of the regenerative processes or cycles in the ion exchangers.

Still another advantageous refinement of the present invention is to perform discharging of the caustic solution from the cathode space and/or the storage zone as a function of that solution's concentration.

These measures, i.e., adjustment of the limit value on the one hand and controlling the discharge of the caustic solution using the concentration of said solution and/or terminating the regenerative treatment of the ion exchangers or restarting treatment of the aqueous solution by means of a predetermined minimum concentration change in the caustic solution, afford a major advantage in that the degree of regeneration is a function of the extent of exhaustion of the previous demineralization cycle, i.e., the amount and concentration of the salts in the treated water, thus providing for full regeneration at all times with only the appropriate amount of regeneration input. This feature is particularly advantageous in practical applications where the demineralization cycle is terminated before complete exhaustion of the ion exchange materials.

Yet another advantageous refinement of the present invention is that the filter chamber for the cation exchanger can be equipped with one or more cooling mechanisms to facilitate the heat transfer from the filter chamber. In particular, the electrical regeneration of the cation exchanger includes several exothermal reactions, the heat of which must be dissipated or eliminated. But, this heat generation limits the input of electrical energy for regeneration in the thermodynamic equilibrium. Thus, by accelerating the heat transfer, a higher current intensity can be used, thereby substantially accelerating the regeneration process. This brings about a greater desalination performance or a larger product output per unit of time. Typical cooling mechanisms useful in the present invention are conventional cooling coils and cooling fins normally used to transfer heat from electrolytic apparatus.

A second exemplary embodiment of the present invention has each filter chamber for the cation exchanger and each filter chamber for anion exchanger as separate functional units, and each functional unit is arranged in separate vessels, but adjacent to each other. This arrangement has the advantage of a lower design height. In addition, the cation exchanger is divided into at least two zones by cation permeable boundary layers, for example, ion exchange membranes. One of the two zones is traversed by the aqueous solution to be treated, and the other by the aqueous solution already partially treated. The hydrogen ions generated at the anode move into the cation exchanger under the influence of the DC electric field toward the cathode and displace the cations (metal ions, e.g., sodium ions), picked up by the flowing water from the ion exchanger. These displaced cations are then collected as caustic solution in a cathode space with the hydroxyl ions formed at the cathode. The discharging of the caustic solution is adjusted according to its concentration and used for regeneration of the anion exchanger.

However, in this embodiment, the anion exchanger is divided into at least two separate filter units which are alternately subjected to the caustic solution regenerative treatment. After completion of the regenerative process, the respective flushings of the anion exchangers are performed preferably in a direction opposite to the direction of displacement of the ions during regeneration.

The aqueous solution being desalinated, in this second embodiment, is first fed into the cation exchanger zone adjacent to the cathode space, then through the respective regenerated anion filter, also preferably in a direction countercurrent to the direction of displacement of the ions during regeneration, and finally fed as a partially treated solution or water to the cation exchanger zone adjacent to the anode space and discharged as product from said zone.

In this second embodiment, the regenerative cation displacement in the electrical field toward the cathode, and the concentrating of the caustic solution formed there in a cathode space and the feeding of said solution into the filter chambers for the anion exchanger, and its use as a regenerant for the anion exchanger, as well as the division of the cation exchanger into chambers separated by cation permeable boundary layers of ion exchange membranes, and the alternate regeneration and charging of anion filters, afford advantages in terms of energy, process engineering and economy. These advantages can be summarized as follows.

First, by dividing the cation exchanger into chambers and separating them by cation permeable membrane, one can perform regenerative treatment of the cation exchanger simultaneously with the demineralization process. This reduces the storage volume of the cation exchanger and the electrode distance. This in turn results in lower electrical resistance between the electrodes, and a significant energy savings. Furthermore, the demineralization performance is substantially enhanced, because the production is continuous. Another advantage is self-cooling of the cation exchanger chambers as a result of the continuous throughput. The greater the desired desalination output, the greater the advantages are.

Second, by introducing the pretreated water flowing out of the anion filter into the cation exchanger chamber adjacent to the anode chamber, any residual caustic solution from the preceding regeneration of the anion filter is removed by the cation exchanger, thus resulting in a substantial improvement in product quality. This arrangement also affords the advantage that the flushing times are reduced and the flushing quantities of the anion filters can be reduced.

Third, continuous operation, which is generally desired, can be achieved in this embodiment while at the same time retaining the above described advantages afforded by using the cathodically produced caustic solution as the regenerant for the anion exchanger. Continuous operation is particularly beneficial in large desalination systems.

These together with other objects and advantages which will become subsequently apparent reside in the details of the method and apparatus as more fully described and claimed hereinafter, reference being had to the accompanying drawings forming a part hereof, wherein like numerals refer to like parts throughout.

BRIEF DESCRIPTION OF THE DRAWINGS

The drawings illustrate two of the many possible embodiments of the present invention, it being intended not to limit the invention solely to these embodiments.

DETAILED DESCRIPTION OF THE PREFERRED EMBODIMENTS

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose. Any particulate regeneratable cation and anion exchange material useful in the demineralization of water can be used in this invention; however, particulate ion exchangers are preferred. Examples of particularly preferred cation exchangers include strong acid polystyrene divinylbenzene cross-linked cation exchangers; examples of preferred anion exchangers include strong base polystyrene divinylbenzene cross-linked Type I, strong base/weak base polystyrene divinylbenzene cross-linked Type II and strong base/weak base acrylic anion exchangers.

Figure 1:
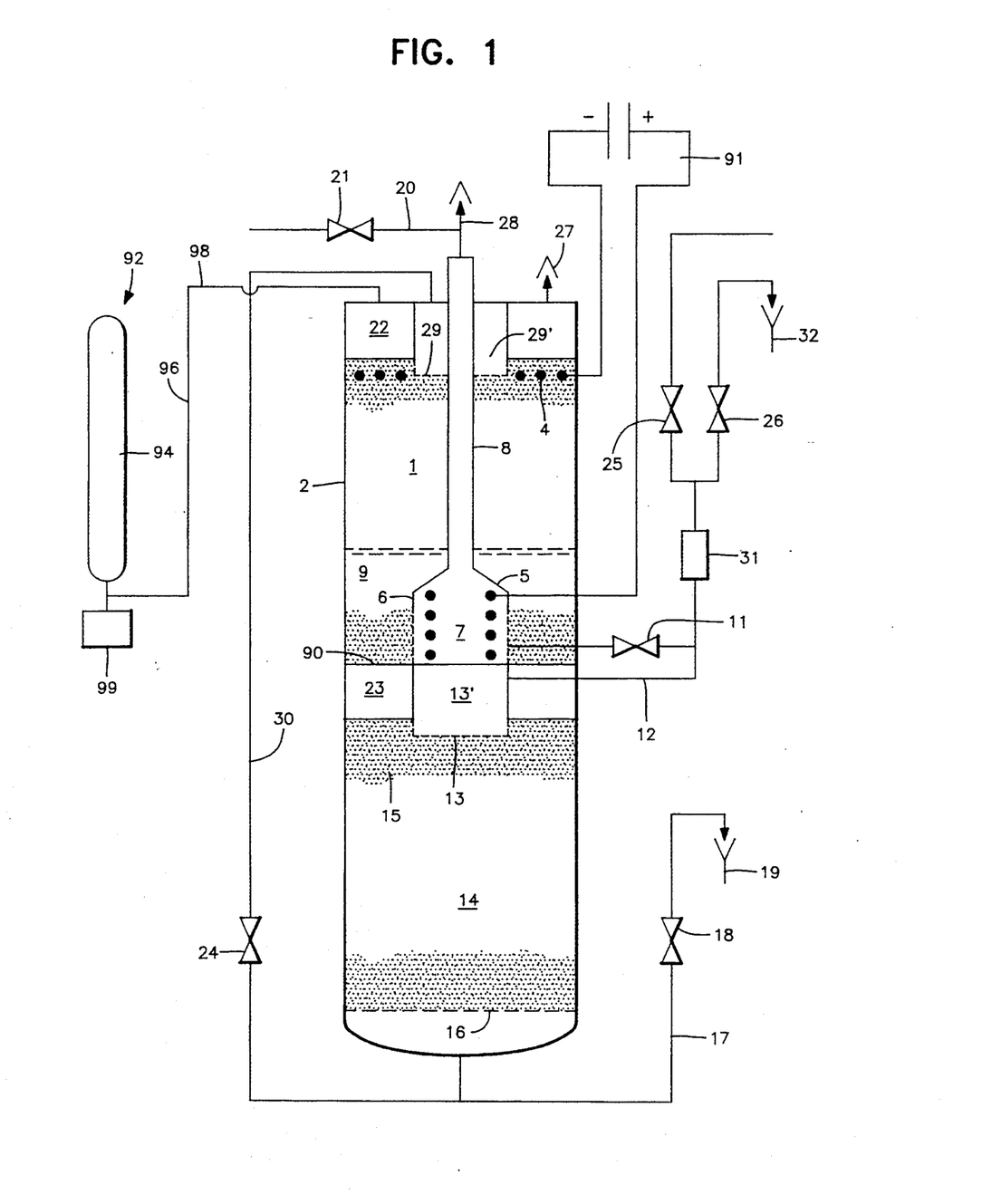
FIG. 1 shows a longitudinal cross-section of one embodiment of the present invention with two filter chambers for ion exchangers, arranged one on top of the other in the same cylindrical vessel and having feed and discharge lines and respective shut-off devices for the various liquid flow paths.

In the embodiment according to FIG. 1, there is shown an apparatus for treating aqueous solutions, such as water for demineralization, preferably softened water, and subsequent regeneration of the ion exchangers. Particulate cation exchanger 3, whether granules, beads or grains, is arranged preferably in layers in a filter chamber 1 of a filter container 2. The regenerative treatment of the cation exchanger occurs in a DC electrical field generated between an anode 4 and a cathode 5 by a power source 91, which may be of any known design. As one possible design, anode 4 is represented as a horizontal wire coil and cathode 5 as a vertical wire coil. The hydrogen ions formed at anode 4 migrate downwardly through cation exchanger 3 toward cathode 5 under the influence of the electrical field. The hydrogen ions are absorbed by this ion exchanger and the cations, for example sodium ions, already absorbed in ion exchanger 3 as a result of the preceding desalination cycle are displaced. The displaced cations then migrate through a filter medium 6, for example of cylindrical design, toward cathode 5, where they form a caustic solution with the hydroxyl ions produced at the cathode. This caustic solution is collected in cathode space 7, as well as in a storage zone 9 at the bottom of the filter chamber 1. As the regeneration continues, the concentration of the caustic solution in the cathode space 7 and storage zone 9 steadily increases and can be monitored by a conductivity meter placed at any convenient location. As shown, the filter medium must restrain the cation exchange material away from the cathode, but allow the aqueous electrolyte, ions and caustic solution to pass freely.

The caustic solution is discharged from the cathode space 7 by a valve 11 and is introduced into the upper region of anion exchanger 15, preferably arranged in layers in filter chamber 14 of filter container 2. Filter chamber 1 is separated from filter chamber 14 in container 2 by solid plate 90. The caustic solution is fed to the top of chamber 14 via a pipeline 12 and then through a filter plate 13 which defines a filter space 13'. The caustic solution then flows downward through anion exchanger 15 and exists as brine through filter plate 16, a pipeline 17 and another valve 18 to discharge channel 19. As it flows, the hydroxyl ions are absorbed in a known manner by the ion exchanger and, simultaneously, the anions, such as sulfate ions, chloride ions, etc., already previously absorbed and present by reason of the preceding desalination cycle, are simultaneously displaced by the hydroxyl ions of the caustic solution, thus forming the corresponding salts with the metal ions of the caustic solution, such as sodium ions.

The liquid volume of the caustic solution discharged from the cathode space 7 is constantly replenished with an equal volume of fresh aqueous solution, such as untreated water or preferably softened water, through riser 8 via a feed line 20, with the pressure in filter chamber 1 being held constant by a pressure reducer 21. The amount of the caustic solution discharged per unit of time by valve 11 is controlled by controlling valve 11 as a function of the current flow between electrodes 4 and 5. In this way, the optimum current intensity, i.e., the ionic current, is constantly achieved for a given voltage by means of the self-adjusting caustic solution concentration and by means of the self-adjusting caustic solution level in storage zone 9. This produces an optimum regeneration effect between the electrodes.

As regeneration continues, the flow of the desorbed ions, for example the sodium ions, decreases. Hence, the electrical current intensity, decreases. This decrease is used in the form of a predetermined boundary value as a signal for terminating the regenerative treatment.

Another advantageous type of control for the caustic solution discharge is to control valve 11 as a function of the caustic solution concentration as determined by the conductivity meter. In this way, the concentration of the caustic solution is held at a constant suitable value, for example about 2%, although this concentration value can be varied within wide limits, from about 1% to about 10%. As the flow of the desorbed ions decreases, less and less caustic solution is discharged. Thus, with intermittent actuation of valve 11 at a constant opening time, the number of openings per unit of time decreases. Alternatively, with continuous actuation of valve 11, the valve approaches the closed position. The frequency of the actuation, or the position of valve 11, is therefore used as a signal to terminate regenerative treatment and can additionally be used as a signal for starting the subsequent cycles such as flushing processes and renewed demineralization treatment of the aqueous solution. The control of valve 11 can be accomplished in any known manner and is not shown in the drawing.

Both ion exchanger materials, anion and cation, increase their volume during regeneration. Therefore, to accommodate these increased volumes, an expansion space 22 is provided in filter chamber 1 and another expansion space 23 is provided in filter chamber 14. During regeneration, valves 24, 25 and 26 are closed. Valve 18 is open.

The chemical reactions occurring at the electrodes, anode 4 and cathode 5, release gases. The anodically generated oxygen is discharged by a degassing valve 27, such as a vent valve, from filter chamber 1, and the cathodically produced hydrogen is discharged from cathode space 7 through riser 8 and a degassing valve 28.

The pressure within the cation filter 1 may fluctuate under start up or operational conditions. For example, the formation of electrolyte gases at the electrodes is continuous and uniform while the flow through degassing valves 27, 28 is intermittent since the collection of a certain gas volume is necessary for the opening of the degassers, thus causing a slight pressure increase. Also, when the discharge of the caustic solution from the cathode space 7 is discontinuous, in that the discharge amount is kept constant by a constant opening time, and the rate of discharge is controlled by changing the time between consecutive openings, the pressure in the cation filter 1 may drop before opening of pressure reducer 21 to allow replenishment of fresh aqueous solution through riser 8 via the feed line 20. It is desirable to dampen these pressure fluctuations since all liquid and gas movements in the ion exchangers should be gentle so as not to disturb the layered ion exchange materials. Hence, it is preferable to include a pressure buffer circuit 92. This includes a pressure compensation vessel 94 connected to the top of filter chamber 1 adjacent expansion space 22 through a capillary tube 96, line 98 and a pressure relief valve 99. Vessel 94 is filled with a gas, and the capillary tube 96 functions to produce a slow pressure and liquid equalization.

When a new system is started up, the pressure compensation vessel 94 is first filled with air. Subsequently, the anodically generated oxygen gas is supplied through line 98. The relatively large gas volume attenuates the pressure changes in the system. If the volume in the system becomes greater as a result of increasing gas generation, both gas and liquid can flow from the space below the cover plate through the capillary into the pressure compensation vessel. During product discharge, the pressure in the container decreases slightly, and the liquid and/or gas flows back. In this way, pressure surges are offset.

In the conduct of the regeneration, in particular, the electrolytic regeneration of the cation exchanger, it is desirable to recharge the ion exchanger as quickly and intensively as possible. Since regeneration occurs more quickly and intensively at higher current intensities, it is desirable to employ a high voltage during the initial start-up stage of the regeneration. This high energy input causes the temperature within the filter container i to increase, thus lowering the electrical resistance of the ion exchangers and increasing the rate of regeneration.

Once the regeneration has progressed for a period of time at the high voltage, a lower voltage can be set for steady state operations, keeping in mind that the electrical energy inputed to the electrolytic cell must be dissipated as heat energy either through the walls of the container itself or through some cooling mechanism. While the voltages which can be used initially during start-up and subsequently during steady state conditions, will vary depending upon cell design, it is expected that the steady state voltage will be approximately two-thirds the initial voltage. In one configuration, the start-up voltage was 70 volts; when the current intensity reached 2 amps, the voltage was reduced to 45 volts. It is also believed that the maximum operating temperature of filter container 1 should be about 80°–90° C., if normal heat dissipation is obtained with outside temperatures in the range of 20°–25° C.

After the regenerative phase is terminated, valves 11 and 18 are closed and valves 24 and 26 are open. Untreated water, preferably softened water, is fed through pressure reducer 21 and feed line 20 into riser 8 and passes through filter medium 6 and into filter chamber 1. The water passes through the granular cation exchanger 3 from bottom to top in a direction countercurrent to the direction of the ionic migration during regeneration. Its flow is controlled so as not to rearrange the layers of the ion exchange material. In this process, the cations of the welter are exchanged in a known manner for the hydrogen ions stored in the ion exchanger, and the water passes last through the uppermost layers in the region of anode 4, which have the highest levels of regeneration. As a result of this treatment of the untreated water in a countercurrent direction to the regenerating process, a very high degree of exchange, and hence a very low residual concentration of metallic cations, is achieved in the treated water.

From filter chamber 1 the partially treated water passes through a filter plate 29, a pipeline 30, a valve 24 and through filter plate 16 and into the bottom of filter chamber 14. The water flows upwardly through anion exchanger 15 without rearranging the layers of said exchange material, and also in a direction countercurrent to the regenerative treatment with the caustic solution. In a known way, the anionic components of the water are exchanged for the hydroxyl ions stored in the ion exchanger, and these ions recombine to form water with the hydrogen ions taken up from cation exchanger 3 in filter chamber 1.

The treated solution, such as the desalinated water, passes through filter plate 13 into pipeline 12 and into a measuring device 31 for measuring the conductivity of the water and then through valve 26 into channel 32, if it still contains some caustic solution residue from filter chamber 14. When the end of this flushing phase is indicated on gauge 31 by a correspondingly low conductivity, such as 15 $\mu$S, valve 26 is shut off and the desalinated water is discharged as demineralized product to the consumer through valve 25.

As the ion exchangers are depleted, the demineralization effect decreases. The residual salt concentration and hence the electrical conductivity in the product water increases. When a prescribed limit is exceeded as measured by meter 31, another regeneration process can begin by means of essentially known switching devices.

Figure 2:
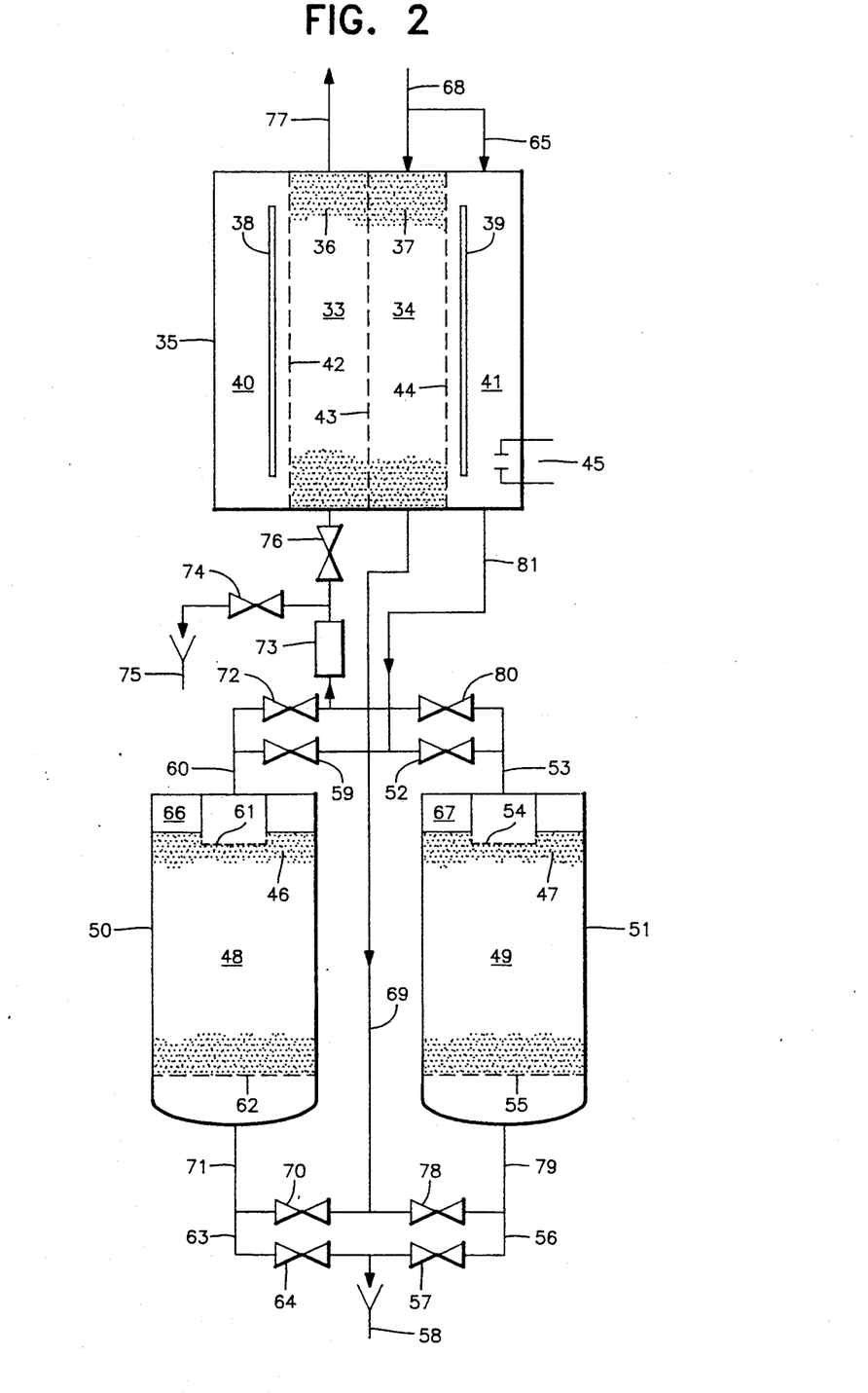
FIG. 2 shows a longitudinal cross-section through a second embodiment of the present invention with the cation exchanger vessel divided into ion exchange filtration chambers by membranes and two separate vessels with filter chambers for anion exchanger, with the various connection lines for the liquid streams and respective shut-off devices.

Turning now to the embodiment shown in FIG. 2, the process proceeds in a manner similar to that previously described except that the cation ion exchange material is divided into layered cation exchangers 36, 37 in filter chambers 33 and 34 of filter container 35. The regenerative treatment is conducted in a DC electrical field generated between anode 38 and cathode 39 by any known DC power source, not shown in the drawing.

Anode chamber 40, cathode chamber 41, and the two cation exchange chambers, filter chambers 33 and 34, are separated from each other by cation permeable, anion blocking and liquid impermeable boundary layers 42, 43, 44, designed as membranes. These cation exchange type membranes are well known, for example, chlor-alkali membranes. Other known cation exchange membranes may be used so long as they are cation permeable, anion blocking and liquid impermeable. The anode chamber 40 is also filled with an electrolyte, such as diluted sulfuric acid, or a solid electrolyte, such as a cation exchanger or the like.

The hydrogen ions formed at the anode 38 migrate under the influence of the electrical field through boundary layers 42, 43 and 44 and through cation exchangers 36, 37 toward cathode 39. The hydrogen ions are absorbed by these exchangers in the process, and at the same time, the cations, for example sodium ions, which come from the liquid streams being treated and absorbed by ion exchangers, are displaced and migrate to the cathode 39, where they form a caustic solution with the hydroxyl ions generated at the cathode. This caustic solution is collected in cathode space 41, steadily raising its concentration, which can be determined by a conductivity gauge 45.

The caustic solution formed is then used for regenerating anion exchangers 46, 47, which are situated in filter chambers 48, 49 of filter containers 50, 51. The anion exchangers are alternately regenerated after charging. If the anion exchanger 47 in filter container 51 is being regenerated, the caustic solution is discharged via pipeline 81 through valve 52, and then fed into the upper region of anion exchanger 47, which is arranged in layers in filter chamber 49, via pipeline 53 through filter plate 54. The caustic solution then flows downwardly through anion exchanger 47 and exits as brine into channel 58 through filter bottom 55, pipeline 56 and valve 57. During passage through the anion exchanger, the corresponding salts are formed from the displaced anions from the anion exchanger and the metal ions of the caustic solution in a known manner.

Once the anion exchanger in filter container 51 is regenerated, valve 52 is closed and valve 59 is opened in order that the caustic solution is fed into the upper region of anion exchanger 46, which is arranged in layers in filter chamber 48 of filter container 50. The caustic solution is fed via pipeline 60 through filter plate 61. The caustic solution then flows downwardly through anion exchanger 46 and exits as brine into channel 58 via filter bottom 62, pipeline 63 and valve 64.

The liquid volume discharged from cathode space 41 is constantly replenished with untreated water, preferably softened water, via feed line 65. Control of the caustic solution discharge from cathode chamber 41 consists of controlling valve 52 together with valve 57 for regeneration of anion exchanger 47. Alternatively, with valve 57 completely open, control of the caustic solution discharge can be a function of the caustic solution concentration, which is determined by conductivity meter 45. For regeneration of anion exchanger 46, valves 59 and, 64 are controlled in the same manner. In this way, the concentration of the caustic solution is held at a constant suitable value, such as 2%. The control of the valves is accomplished in any known way and is not represented in the drawing.

The anion exchangers increase their volume during regeneration. To accommodate these additional volumes, expansion space 66 is provided in filter chamber 48 and expansion space 67 is provided in filter chamber 49.

The aqueous liquid being treated, preferably softened water, is initially fed through pipeline 68 into the top of cation exchange chamber 34. It there passes through cation exchanger 37 from top to bottom and exits through pipeline 69 into filter container 50 or 51, whichever is not undergoing regeneration at that time. For example, if the anion exchanger 47 in filter container 51 is undergoing regeneration, the aqueous liquid being treated passes through valve 70, pipeline 71 and filter bottom 62 into filter chamber 48. Here, the liquid flows upwardly through anion exchanger 46 from bottom to top, i.e., in a direction countercurrent to the flow direction of the caustic solution during the preceding regeneration cycle. As the aqueous solution passes through the chamber 48, the caustic solution is first displaced, and the anions of the liquid being treated are then absorbed by the ion exchanger. The initially displaced caustic solution and then the pretreated liquid pass through filter plate 61 and valve 72 into conductivity meter 73. If the quality is still poor, for example, because of the displaced caustic solution or residues thereof, the liquid is discharged through valve 74 into channel 75. If the quality is adequate, the liquid is fed through valve 76 into cation exchange chamber 33, where it passes through cation exchanger 36, which absorbs any traces of metal ions. The desalinated liquid is then discharged as product through pipeline 77 or fed to the consumer.

A pressure buffer circuit, similar to circuit 92 in FIG. 1, may be used in the embodiment shown in FIG. 2, but it is not shown in the drawing. The circuit is not as desirable in this embodiment since the pressure fluctuations are less due to the throughput of the aqueous solution being demineralized.

These above described process steps proceed the same when anion filter 50 is being regenerated. In this case, the liquid passes through valve 78, pipeline 79, filter bottom 55 anion exchanger 47, filter plate 54 and through valve 80 into conductivity gauge 73. As described above, depending on its quality, the liquid is discharged either into channel 75 or as desalinated product through pipeline 77.

As either anion exchanger 47 or 48 is depleted, the desalination effect decreases and the residual salt concentration increases. When a prescribed limit is exceeded, as measured by conductivity gauge 73, switching of filter containers 50, 51 can be produced by means of any known type switching devices, not shown in the drawings. The electrical current flowing between electrodes 38 and 39 can also be adjusted in an essentially known way as a function of the desalination output and also is not shown in the drawings.

It is important in the present invention to minimize the scaling of the cation exchange material since such scaling can interfere with the electrolytic regeneration of the cation exchanger. Accordingly, it is clearly preferred in the present invention that all water introduced to the cation exchanger, whether it be the untreated water to be demineralized or the makeup water introduced through riser 8 or feed line 65, be softened, or otherwise treated to remove scaling components. Further, while the preferred form of the invention is countercurrent demineralization/regeneration flows, i.e., that the aqueous solution to be demineralized flows in a direction countercurrent to the movement of the regenerating ions and caustic solution, it is contemplated that the present invention can be used with co-current flows, or other flows, and the present invention is not limited to the relative direction of flows or the aqueous solution to be treated and the regenerating ions and caustic solution.

Further, the foregoing also should be considered only as illustrative of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A process for demineralizing an aqueous solution containing salts which comprises:
    passing the solution through a separate bed cation exchange material and a separate bed anion exchange material to remove salts from said solution;
    electrolytically regenerating said cation exchange material by applying a DC electric voltage between an anode and a cathode across only said separate bed cation exchange material while at the same time forming a caustic solution with cations displaced from said cation exchange material and hydroxyl ions produced at said cathode; and chemically regenerating said anion exchange material using said caustic solution.

2. A process in accordance with claim 1 wherein said aqueous solution has been previously softened to remove scale-forming cations.

3. A process in accordance with claim 1 wherein the passing of said aqueous solution through said cation exchange material is in a direction different from said hydrogen ions and said displaced cations, and the passing of said aqueous solution through said anion exchange material is in a direction countercurrent to said caustic solution.

4. A process in accordance with claim 1 wherein said caustic solution is collected adjacent the cathode in said chamber containing the cation exchange materials and is transferred therefrom to said chamber containing the anion exchange materials.

5. A process in accordance with claim 4 wherein said electric voltage creates an ionic current between said anode and cathode and said caustic solution is transferred from adjacent said cathode as a function of said ionic current.

6. A process in accordance with claim 4 wherein the rate at which said caustic solution is transferred from adjacent said cathode is adjusted according to the concentration of the caustic solution collected in said cation exchange chamber.

7. A process in accordance with claim 4 wherein water is constantly added to said cation chamber to make up for the caustic solution transferred to said anion chamber.

8. A process in accordance with claim 7 wherein said make-up water has been previously softened to remove all scaling-forming ions.

9. A process in accordance with claim 1 wherein the regenerating step is started or stopped according to a limit value of current intensity caused by said DC electric voltage.

10. A process in accordance with claim 1 wherein said anion exchange material is flushed after regeneration to remove residual caustic solution before beginning another cycle of demineralizing said aqueous solution.

11. The process in accordance with claim 1 wherein a pressure buffering circuit is associated with said cation chamber to dampen pressure fluctuations in said chamber.

12. A process in accordance with claim 1 wherein a high voltage is initially applied during regeneration and a reduced voltage is applied after a specified regeneration temperature is obtained.

13. A process in accordance with claim 1 wherein electrolytic gases formed during the regeneration escape the cation chamber through degassing valves.

14. A process for discontinuously demineralizing a softened aqueous solution containing residual salts which comprises a demineralization cycle including:

passing the solution first through a chamber containing cation exchange material to remove cations from said solution;

passing the solution next through a chamber containing anion exchange material to remove anions from said solution and a regeneration cycle including:

electrolytically regenerating said cation exchange material by applying a DC electric voltage between an anode which forms hydrogen ions and a cathode which forms hydroxyl ions, causing said hydrogen ions to migrate into said cation exchange material and displace cations absorbed thereon from said solution, and causing said displaced cations to migrate toward said cathode and form a caustic solution with said hydroxyl ions adjacent said cathode;

chemically regenerating said anion exchange material with said caustic solution by displacing anions absorbed on said anion exchange material from said solution with said hydroxyl ions;

and resuming treatment of said softened aqueous solution upon completion of said regeneration cycle.

15. A process in accordance with claim 14 wherein said electric voltage creates an ionic current between said anode and said cathode and said caustic solution is transferred at a rate which is a function of the intensity of said ionic current.

16. A process in accordance with claim 14 wherein said caustic solution is transferred at a rate depending upon the concentration of the caustic solution adjacent said cathode.

17. A process in accordance with claim 14 wherein the regenerating cycle is started or stopped according to a limit value of current intensity caused by said DC electric voltage.

18. A process in accordance with claim 14 wherein a high voltage is initially applied during regeneration and a reduced voltage is applied after a specified regeneration temperature is obtained.

19. The process in accordance with claim 14 wherein the pressure in said cation chamber is buffered in order to dampen pressure fluctuations in said chamber.

20. A method for continuously treating an aqueous solution to remove salts therefrom, which comprises:

passing the solution through a first portion of a cation exchange material to remove cations therefrom, then alternatively through a first or a second separate anion exchange material to remove anions therefrom, and then through a second portion of said cation exchange material to remove additional cations therefrom;

electrolytically regenerating said cation exchange material by displacing cations absorbed on said cation exchange material with hydrogen ions produced by an anode;

forming a caustic solution with said displaced cations and hydroxyl ions produced by a cathode; and alternatively regenerating the second or first anion exchange material with said caustic solution while said aqueous solution is passing through said other anion exchange material and while continuously electrolytically regenerating said cation exchange materials.

21. A method in accordance with claim 20 wherein said aqueous solution has been previously softened to remove scale-forming cations.

22. A method in accordance with claim 20 wherein the passing of said aqueous solution through said cation exchange material is in a direction different from said hydrogen ions and said displaced cations, and the passing of said aqueous solution through said other anion exchange material is in a direction countercurrent to said caustic solution.

23. A method in accordance with claim 20 wherein said caustic solution is transferred from adjacent said cathode to said second or first anion exchange material for said alternative regeneration and is transferred at a rate depending upon the concentration of the caustic solution adjacent said cathode.

24. A method in accordance with claim 20 wherein the aqueous solution is passed through the first or the second separate anion exchange material until the residual salt concentration exceeds a prescribed upper limit at which time the solution is then passed to the other anion exchange material.

25. An apparatus for removing ions from an aqueous solution containing salts, which comprises:
(a) separate bed cation exchange material and anion exchange material;
(b) an electrolytic means having an anode and a cathode with only said separate bed cation exchange material therebetween;
(c) means for generating an ionic circuit in said electrolytic means to move previously absorbed cations from said cation exchange material to said cathode and to form a caustic solution adjacent said cathode; and
(d) means to transfer said caustic solution from said electrolytic means to said anion exchange material for chemical regeneration of said separate bed anion exchange material.

26. An apparatus in accordance with claim 25 wherein said cation exchange material and anion exchange material are each in a filter chamber forming a functional unit combined in a common housing.

27. An apparatus in accordance with claim 26 wherein the filter chamber for said cation exchange material is positioned on top of the filter chamber for said anion exchange material.

28. An apparatus in accordance with claim 26 and further including means to constantly add water to said cation filter chamber to make up for caustic solution transferred therefrom to said anion filter chamber.

29. An apparatus in accordance with claim 25 wherein said electrolytic means includes a cooling element for dissipating the heat generated during electrolysis.

30. An apparatus for demineralizing a softened aqueous solution containing residual salts which comprises:
a) a first filter chamber containing an anode and a cathode and only cation exchange material therebetween;
b) a second filter chamber containing anion exchange material therein;
c) means for generating an ionic circuit in said first filter chamber to electrolytically regenerate said cation exchange material and form a caustic solution in said first filter chamber adjacent said cathode; and
d) means to chemically regenerate said anion exchange material in said second filter chamber using said caustic solution transferred from said first filter chamber.

31. An apparatus in accordance with claim 30 and including a pressure buffering circuit associated with said first filter chamber to dampen pressure fluctuations therein.

32. An apparatus in accordance with claim 30 and including means to control the transfer of caustic solution from said first filter chamber as a function of said ionic circuit.

33. An apparatus in accordance with claim 30 and including means to adjust the transfer of caustic solution from said first filter chamber according to the concentration of the caustic solution therein.

34. An apparatus in accordance with claim 30 and including means to constantly add water to said first filter chamber to make up for caustic solution transferred from said first filter chamber.

35. An apparatus for continuously treating an aqueous solution to remove salts therefrom which comprises:
a) a cation filter container having an anode and anode chamber, à cathode and cathode chamber and at least two cation exchanger chambers therebetween, all separated by cation permeable, anion blocking and liquid impermeable means;
b) at least a first and second anion filter containers containing anion exchanger;
c) electrolytic means for regenerating said cation exchanger and forming a caustic solution in said cathode chamber;
d) means for passing the aqueous solution first through said cation exchanger chamber adjacent said cathode, next through either the first or second anion filter container and then through the cation exchanger chamber adjacent the anode; and
e) means for alternately transferring said caustic solution to the first or second anion filter container while said aqueous solution is passing through said other anion filter container and through said cation exchanger chambers.

36. An apparatus in accordance with claim 35 and further including means to control the rate of transfer of said caustic solution to said first or second anion filter container depending upon the concentration of the caustic solution in said cathode chamber.

37. An apparatus in accordance with claim 35 and further including means to add water to said cathode chamber to make up for the caustic solution transferred therefrom.

* * * * *